(12) United States Patent
McCombs

(10) Patent No.: US 8,092,593 B2
(45) Date of Patent: Jan. 10, 2012

(54) ARCHITECTURAL STONE COMPOSITION AND METHOD OF USE

(76) Inventor: Melvin Scott McCombs, Henderson, NV (US)

(*) Notice: Subject to any disclaimer, the term of this patent is extended or adjusted under 35 U.S.C. 154(b) by 0 days.

(21) Appl. No.: 12/817,875

(22) Filed: Jun. 17, 2010

(65) Prior Publication Data

US 2010/0319583 A1   Dec. 23, 2010

Related U.S. Application Data

(60) Provisional application No. 61/187,881, filed on Jun. 17, 2009.

(51) Int. Cl.
*C04B 41/53* (2006.01)
*C04B 14/22* (2006.01)
*C04B 18/16* (2006.01)
*C04B 14/28* (2006.01)

(52) U.S. Cl. ........ 106/814; 106/692; 106/695; 106/705; 106/709; 106/716; 156/60; 156/153; 264/162; 264/232; 264/333; 264/340; 428/688; 428/703; 428/933

(58) Field of Classification Search ............... 106/716, 106/814, 692, 695, 705, 709; 156/60, 153; 264/162, 232, 333, 340; 428/688, 703, 903.3
See application file for complete search history.

(56) References Cited

U.S. PATENT DOCUMENTS

| | | | |
|---|---|---|---|
| 6,084,011 A * | 7/2000 | Lucero et al. | 524/5 |
| 7,284,930 B2 * | 10/2007 | Shi et al. | 405/129.1 |
| 2002/0053304 A1 * | 5/2002 | Pelot et al. | 106/716 |
| 2004/0060479 A1 * | 4/2004 | Valenzano | 106/716 |
| 2005/0045069 A1 * | 3/2005 | McCarthy et al. | 106/716 |
| 2006/0000172 A1 * | 1/2006 | Sumrall | 52/309.17 |
| 2008/0141907 A1 * | 6/2008 | Campbell | 106/695 |

FOREIGN PATENT DOCUMENTS

| | | | |
|---|---|---|---|
| GB | 2441999 A * | | 3/2008 |
| KR | 20-0165087 Y1 | | 2/2000 |
| KR | 10-2001-0045071 A | | 6/2001 |
| WO | WO 2004/050578 A2 * | | 6/2004 |

* cited by examiner

Primary Examiner — Anthony Green
(74) Attorney, Agent, or Firm — Greenberg Traurig

(57) ABSTRACT

Compositions for fabricating architectural works wherein the compositions utilize one or more cement materials, additives, fibers and recycled glass. Exemplary cement materials include Portland cement, calcium aluminate, fly ash and/or E glass. Exemplary additives include boric acid, citric acid, lithium, plasticizer and/or methylcellulose ethers. Exemplary fibers include polyvinyl alcohol (PVA) and/or micro-fibers. Crushed recycled glass is used as an aggregate or non-reactive material. Other ingredients may be used including: sodium hydroxide, potassium hydroxide and hydrated lime to alter the PH; ferrous sulfate, mono-potassium phosphate, or manganese carbonate and magnesium sulfate as color enhancements; and/or pozzolans (Vcas) to neutralize the ASR efflorescence.

8 Claims, 3 Drawing Sheets

ARCHITECTURAL STONE COMPOSITION AND METHOD OF USE

CROSS-REFERENCE

This application claims the benefit of U.S. Provisional Application No. 61/187,881 filed Jun. 17, 2009 and which is incorporated herein for all purposes.

FIELD OF THE INVENTION

The embodiments of the present invention are directed to a composition for use with fabricating architectural stone works. Advantageously, the composition includes recycled glass.

BACKGROUND

Many architectural works are conventionally fabricated utilizing cement compositions. Such exemplary architectural works include, but are not limited to, Balustrade Systems, Helical Staircases/Stair Treads, Urns, Kitchen Hoods & Backsplash, Porte-cocheres & Porticos, Crown Moldings, Buried Headers, Rafter Tails, Medallions, Keystones & Shields, Arabesques, Wall & Pier Caps, Wall Veneer Pavers, Driveway Pavers, Road Pavers, Walkway Pavers, Floor Pavers, Artificial Rock, Stone Veneer & Quoins, Domes & Gazebos, Medallions, Wainscot & Base Moldings, Window Moldings, Window Headers, Windowsills, Corbels, Mantels & Over Mantels, Flooring/Wood Grain Flooring, Columns, Fountains/Wall Fountains, Soffit & Cornice Moldings, Shutters, Trim Moldings, Cartouche, Capitals, Bases, Chair Rail Trims, Art work and Scuppers. Public works products, such as highway and parking lot barricades, park benches and trash receptacles, may also be fabricated using the compositions disclosed herein.

While conventional cement compositions are suitable to create architectural works like those mentioned above, it would be advantageous for many reasons as set forth below to modify the compositions with the inclusion of recycled glass.

SUMMARY

The embodiments of the present invention are directed to compositions for fabricating architectural works wherein the compositions utilize one or more cement materials, additives, fibers and recycled glass. Exemplary cement materials include Portland cement, calcium aluminate, fly ash and E glass ground to 325 mesh. Exemplary additives include boric acid, citric acid, lithium, plasticizer or methylcellulose ethers. Exemplary fibers include polyvinyl alcohol (PVA) or microfibers promoted under the brand name Strux®. According to the embodiments of the present invention, crushed recycled glass is used as an aggregate or non-reactive material.

The compositions of the embodiments of the present invention are formed by mixing specific quantities of the ingredients with water. The final product is then used in a manner as set forth below.

The use of recycled glass has numerous benefits to the final architectural work and the environment. In one embodiment, the surface of the final product can be sanded allowing the color(s) of the recycled glass particles to be visible on the surface of the architectural work. The use of recycled glass also helps the environment by providing a use for recycled glass. Glass takes upwards of 1,000,000 years to biodegrade. In other words, the human race will go extinct prior to glass biodegrading. Therefore, finding significant uses for recycled glass promotes the recycling of glass. Moreover, recycling glass saves energy and saves raw materials. In a specific instance, by utilizing recycled glass for architectural works, the city of Las Vegas is able to create a closed loop recycling program wherein all available used glass may be recycled via the embodiments of the present invention. In other words, the city of Las Vegas will have a local use for all of the glass that is available fro recycling.

Other variations, embodiments and features of the present invention will become evident from the following detailed description, drawings and claims.

DETAILED DESCRIPTION

Figure 1:
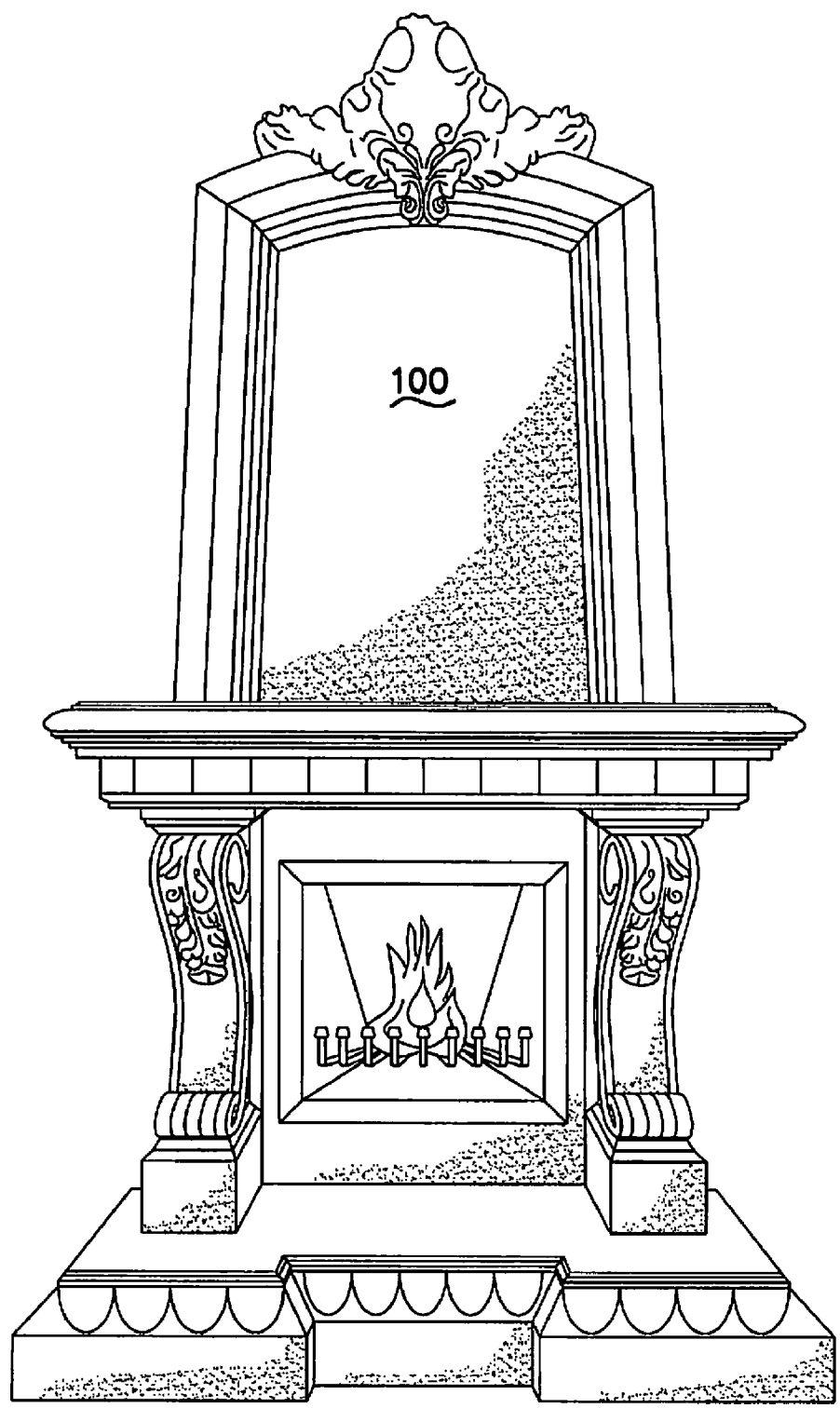
FIG. 1 illustrates an exemplary architectural work which may be fabricated utilizing the compositions according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

In a first embodiment of the present invention, a composition according to the embodiments of the present invention comprises one or more cement materials including Portland cement, calcium aluminate, fly ash and/or E glass (i.e., fiber-glass) ground to specified mesh level (e.g., 275 to 400 mesh), along with water and crushed recycled glass. In other embodiments other ingredients may be used including: 1) calcium may be used as a filler of a desired size; 2) boric acid or citric acid may be used to slow down the mix; 3) lithium may be used to speed up the mix and cross-link alkali to prevent alkali silica reaction (ASR) which can cause expansion and cracking; 4) plasticizer may be used to keep the percentage of water in a suitable range; 5) methylcellulose ethers maybe used to thicken the mixture; 6) polyvinyl alcohol and Strux® may be used to help strengthen the final product; 7) sodium hydroxide, potassium hydroxide and hydrated lime to alter the PH; 8) ferrous sulfate, mono-potassium phosphate, or manganese carbonate and magnesium sulfate are color enhancements; and/or 9) pozzolans (Vcas) to neutralize the ASR efflorescence. In one embodiment, the recycled glass accounts for 90% or more of the composition.

One exemplary composition includes 49.5% fly ash, 49.5% glass aggregate (crushed recycled glass) and 1% boric acid. Those skilled in the art will understand that other compositions including the aforementioned ingredients and those with similar properties are possible within the spirit and scope of the present invention.

No matter which ingredients are used, the ingredients are mixed together in no particular order with water in specified amounts to form a final product of a desired consistency. The final product may then be used in a variety of ways depending on the architectural work involved. In one example, the final product may be hand placed into a mold giving each work a unique look. In another example, the final product is sprayed into a mold resulting in a smooth finish. In yet another example, multiple colors of the final product may be hand placed into a mold to give each piece a unique look. The pieces are worked on with a trowel or other tools, hand-finished and removed from the mold. Thin cross-sections allow lightweight architectural works to be created.

Figure 2:
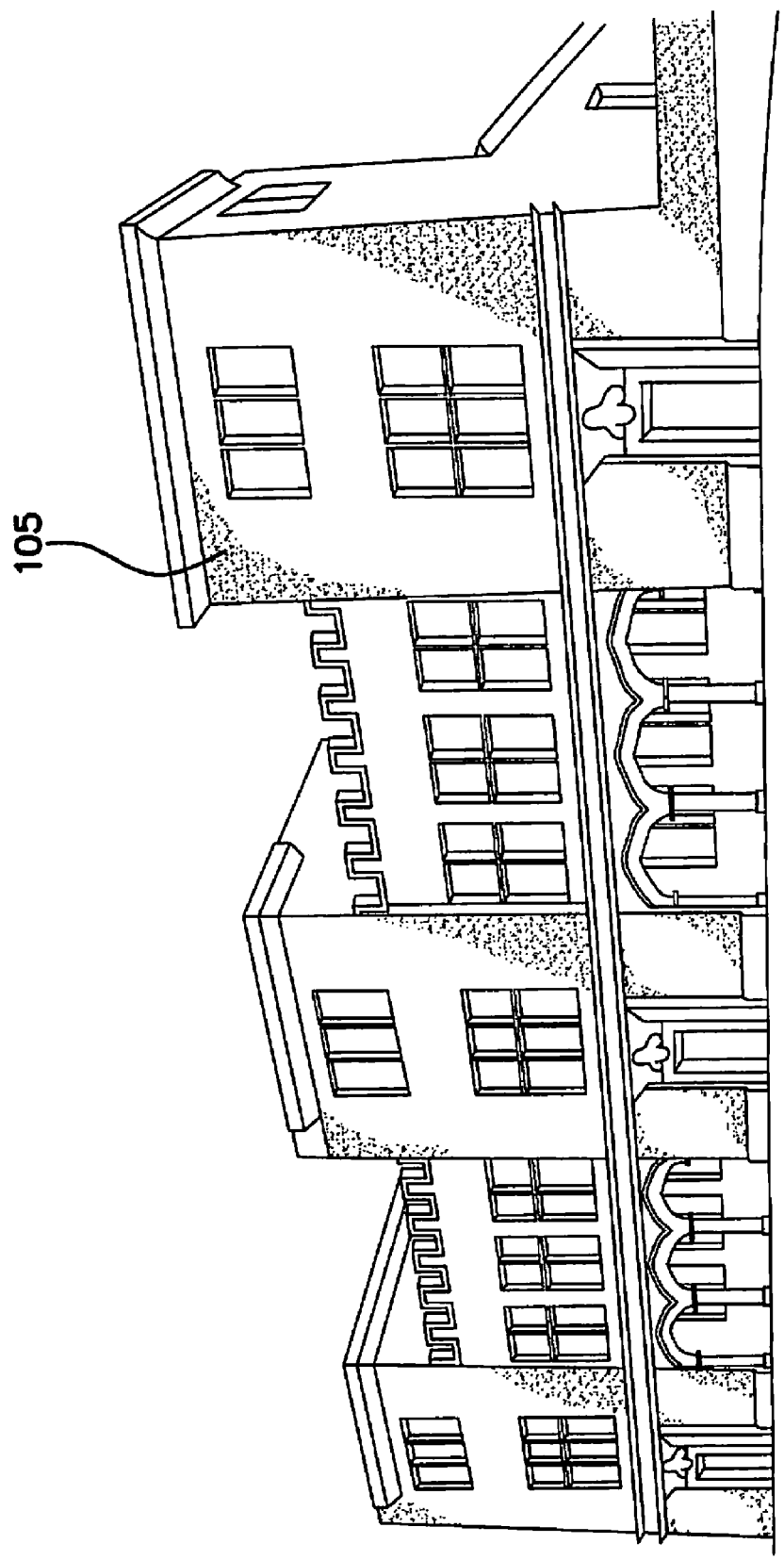
FIG. 2 illustrates another exemplary architectural work which may be fabricated utilizing the compositions according to the embodiments of the present invention.

FIG. 1 illustrates an exemplary architectural work in the form of a royal vendetta 100 which can be fabricated using the compositions according to the embodiments of the present invention. FIG. 2 illustrates another exemplary architectural work in the form of building facade 105. Those skilled in the art will recognize that any architectural work may be fabricated using the compositions according to the embodiments of the present invention.

Figure 3:
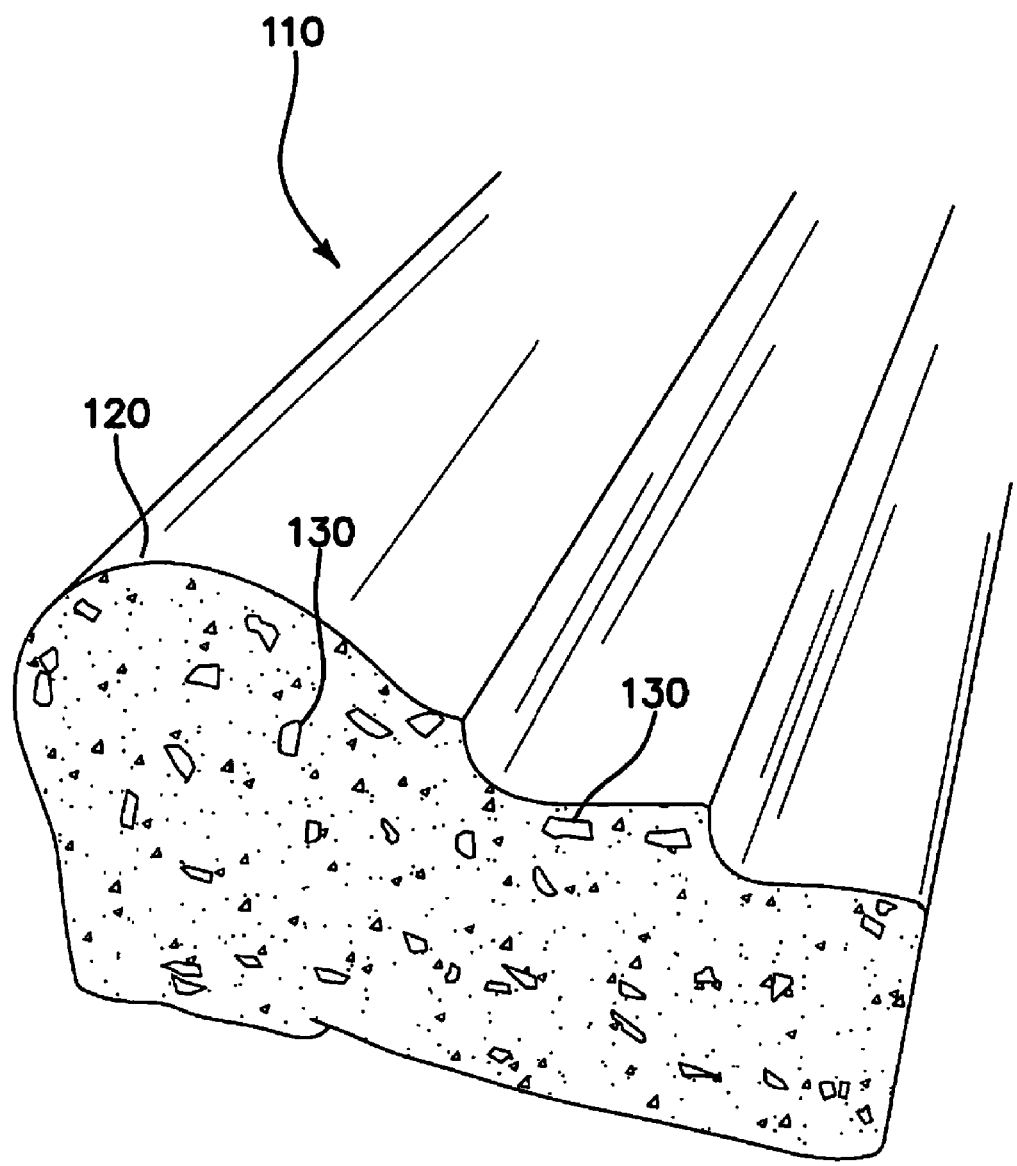
FIG. 3 illustrates an architectural work fabricated using a composition of the embodiments of the present invention having a portion sanded down such that the recycled glass is visible.

FIG. 3 illustrates a trim mold 110 which can be fabricated using the compositions according to the embodiments of the present invention. An end 120 of the mold 110 has been sanded such that recycled glass 130 particles are visible. In other words, the recycled glass 130 particles may thus become an aesthetic feature of the architectural work.

In another embodiment, cement or glass building panels may be fabricated using the foregoing compositions. A polyurethane backing may be applied to the cement or glass building panels to add insulation value to the panels.

While exemplary compositions and applications for the compositions according to the embodiments of the present invention have been described herein, it should also be understood that the foregoing is only illustrative of exemplary and/or preferred embodiments, as well as principles of the embodiments of the present invention, and that various modifications can be made by those skilled in the art without departing from the scope and spirit of the present invention. Therefore, the described embodiments should not be considered as limiting of the present invention in any way. Accordingly, the present invention embraces alternatives, modifications and variations which fall within the spirit and scope of the compositions and applications described herein.

Although the invention has been described in detail with reference to several embodiments, additional variations and modifications exist within the scope and spirit of the invention as described and defined in the following claims.

I claim:

1. An architectural structure comprising:
   a form molded using a composition of at least a cement material, water, and crushed recycled glass;
   wherein said form, when dried, is sanded to render pieces of said crushed recycled glass visible on outer surfaces of said form; and
   a backing of insulative material.

2. The architectural structure of claim 1 wherein said cement material is selected from the group consisting of: Portland cement, calcium aluminate and/or fly ash.

3. The architectural structure of claim 1 further comprising one or more of the following ingredients:
   calcium carbonate; manganese carbonate; boric acid; citric acid; lithium; plasticizer; methylcellulose ethers; polyvinyl alcohol; sodium hydroxide; potassium hydroxide; ferrous sulfate; mono-potassium phosphate; magnesium sulfate; hydrated lime; and/or pozzolans.

4. The architectural structure of claim 1 is further comprising 90% or more recycled glass.

5. A method comprising:
   mixing a cement material with water and crushed recycled glass to form a building composition; and
   fabricating an architectural structure using the building composition by: (i) placing said composition in a mold; (ii) allowing the composition to dry; (iii) removing the dried composition from said mold; (iv) sanding said dried composition to render pieces of said crushed recycled glass visible on outer surfaces of said architectural structure; and (v) applying a backing of insulative material.

6. The method of claim 5 further comprising mixing in one or more of the following ingredients to form the building composition:
   calcium carbonate; manganese carbonate; boric acid; citric acid; lithium; plasticizer; methylcellulose ethers; polyvinyl alcohol; sodium hydroxide; potassium hydroxide; ferrous sulfate; mono-potassium phosphate; magnesium sulfate; hydrated lime; and pozzolans.

7. The method of claim 5 further comprising utilizing 90% or more recycled glass.

8. The method of claim 5 further comprising selecting the cement material from the group consisting of: Portland cement, calcium aluminate and/or fly ash.

* * * * *